(12) United States Patent
Kubinec

(10) Patent No.: US 6,192,069 B1
(45) Date of Patent: Feb. 20, 2001

(54) CIRCUIT AND METHODOLOGY FOR TRANSFERRING SIGNALS BETWEEN SEMICONDUCTOR DEVICES

(75) Inventor: James J. Kubinec, Reno, NV (US)

(73) Assignee: Advanced Micro Devices, Inc., Sunnyvale, CA (US)

( * ) Notice: Under 35 U.S.C. 154(b), the term of this patent shall be extended for 0 days.

(21) Appl. No.: 08/962,667

(22) Filed: Nov. 3, 1997

(51) Int. Cl.⁷ ................. H04B 1/38; H04L 5/16
(52) U.S. Cl. .............. 375/220; 340/310.06; 375/285
(58) Field of Search ................. 375/220, 256, 375/257, 259, 377, 285, 296, 346, 350; 341/100, 101; 395/891; 340/310.01, 310.06; 257/497

(56) References Cited

U.S. PATENT DOCUMENTS

| | | |
|---|---|---|
| 4,631,361 * | 12/1986 | Miller ................. 379/351 |
| 5,132,572 | 7/1992 | Woo . |
| 5,220,216 | 6/1993 | Woo . |
| 5,227,679 | 7/1993 | Woo . |
| 5,264,745 | 11/1993 | Woo . |
| 5,349,612 | 9/1994 | Guo et al. . |
| 5,363,419 | 11/1994 | Ho . |
| 5,367,542 | 11/1994 | Guo . |
| 5,400,370 | 3/1995 | Guo . |
| 5,452,333 | 9/1995 | Guo et al. . |
| 5,457,336 | 10/1995 | Fang et al. . |
| 5,457,719 | 10/1995 | Guo et al. . |
| 5,818,821 * | 10/1998 | Schurig ................. 370/293 |
| 5,886,539 * | 3/1999 | Bell ................. 326/82 |

\* cited by examiner

*Primary Examiner*—Chi H. Pham
*Assistant Examiner*—Jean B. Corrielus

(57) ABSTRACT

A circuit and method for signalling between chips implements signal transfer through a power supply line. Parallel data bits are serialized into a serial data stream and sent from a source semiconductor device through the power supply line to a destination semiconductor device. The destination semiconductor device receives the serial data stream and, using a high pass filter, selects the high-frequency component of the power supply line, and deserializes the serial data stream into parallel bits. A low pass filter interconnecting the power supply line and the chip provides a steady power supply potential to operate the functional elements of the chip.

16 Claims, 6 Drawing Sheets

CIRCUIT AND METHODOLOGY FOR TRANSFERRING SIGNALS BETWEEN SEMICONDUCTOR DEVICES

TECHNICAL FIELD

The invention relates generally to semiconductor devices and, more particularly, to inter-device signal transfer circuitry and methodology.

BACKGROUND ART

Modern semiconductor integrated circuit devices, or "chips," form their electrical connections with the outside world through pins. In particular, pins are used to supply power and ground reference potentials to the chip. For example, a CMOS or TTL semiconductor device receives a supply potential of 5 V through one pin, and a ground potential of 0 V through another pin. Integrated circuits implemented in other forms of logic, such as ECL, receive other reference potential levels as supply and ground and may even receive a plurality of supply potentials.

Pins are also used to carry electrical signals between chips. Specifically, pins provide electrical connections for transferring bit data from one chip to another. Conventional chips use multiple pins to input and output multiple bit data. For example, in FIG. 1, conventional IC 100 transmits 8-bit parallel data (a "byte") to IC 110 using transmit data pins D0 to D7 and transmit data strobe pin TDS. Transmit data strobe pin TDS is used for signalling that the multiple-bit data on pins D0 to D7 are valid. IC 110 receives the byte at pins D0 to D7, when signaled by received data strobe RDS. Pins D0 to D7 in FIG. 1 are bidirectional, allowing for data to be both transmitted and received through the same pins.

IC 100 further comprises receive data strobe pin RDS for receiving a signal indicating that data on pins D0 to D7 are ready to be read. In this configuration, the number of pins required for signalling is ten and the number of pins required for receiving reference potentials is two, for a total of twelve pins for each chip.

Pins, although necessary, consume space on the chip and often require expensive packaging. Therefore, a need exists to greatly reduce the number of pins required by semiconductor devices.

DISCLOSURE OF THE INVENTION

According to the present invention, a circuit for transferring signals between chips comprises a power supply pin. The power supply pin couples the chip to a power supply line. A first filter is coupled to the power supply pin and functional elements of the chip for supplying a low-frequency signal from the power supply line to the chip functional elements. A second filter is coupled between the power supply pin and a transceiver for supplying the transceiver with high-frequency signal components of the power supply line. The transceiver, coupled to the second filter and chip functional elements, is configured for serializing and deserializing multiple bit data received from and supplied to the power supply line for signal transfer between chips.

In another aspect of the invention, a network of semiconductor devices comprises a common power supply line, with each semiconductor device having a power supply pin coupled to the power supply line. A first filter is coupled to the power supply pin and functional elements of the chip for supplying a low-frequency signal from the power supply line to the chip functional elements. A second filter is coupled between the power supply pin and a transceiver for supplying the transceiver with high-frequency signal components from the power supply line. The transceiver, coupled to the second filter and chip functional elements, is configured for serializing and deserializing multiple bit data for the chip functional elements as high-frequency components from and to the power supply line.

In accordance with another aspect of the invention, a method for communicating between a source semiconductor device and a destination semiconductor device comprises the step of serializing bits into a serial data stream and outputting the serial data stream to a power supply line. The method includes filtering out the serial data stream as high frequency components from the power supply and deserializing the serial data stream.

BRIEF DESCRIPTION OF DRAWINGS

The present invention is illustrated by way of example, and not by way of limitation, in the figures of the accompanying drawings and in which like reference numerals refer to similar elements and in which.

BEST MODE FOR CARRYING OUT THE INVENTION

A circuit and method for signalling through a power supply pin of an integrated circuit are described. In the following description, for purposes of explanation, numerous specific details are set forth to provide a thorough understanding of the present invention. It will be apparent, however, that the present invention may be practiced without these specific details. In other instances, well-known structures and devices are shown in block diagram form to avoid unnecessarily obscuring the present invention.

Figure 1:
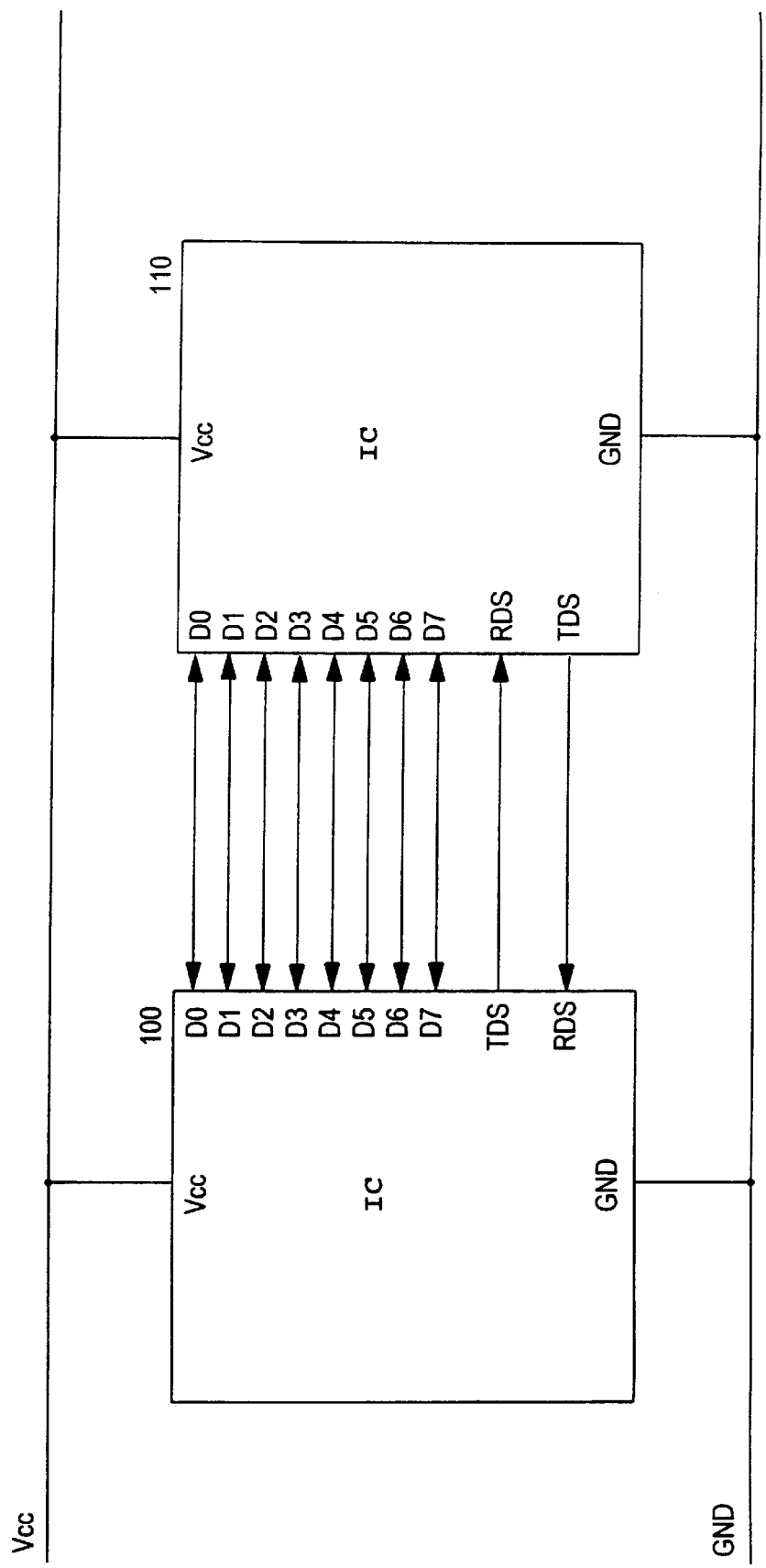
FIG. 1 is a block diagram of a connection between two conventional semiconductor devices.
Figure 2:
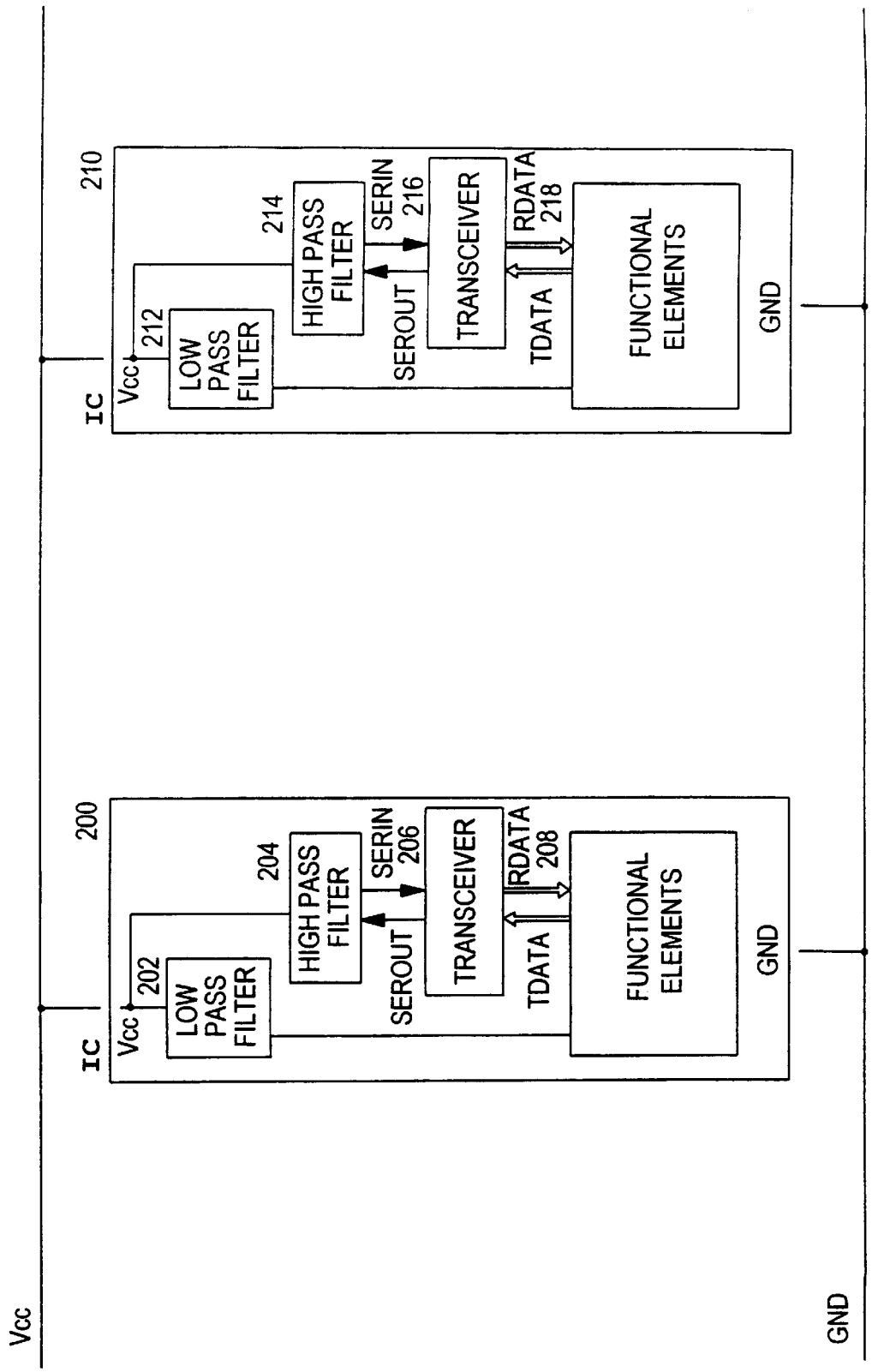
FIG. 2 is a block diagram showing connections between two semiconductor devices according to the present invention.

With reference to FIG. 2, a serial link connection is implemented over the power supply line $V_{CC}$ between IC 200 and IC 210. The serial link connection allows parallel data, conventionally signalled by multiple pins, to be transmitted and received serially through the power supply pin. Thus, the multiple, parallel pin configuration is eliminated in favor of a single power supply pin.

IC 200 comprises low pass filter 202 and high pass filter 204, each coupled to power supply line Vcc. Low pass filter 202 is coupled to functional elements 208, which implements the functionality of the semiconductor device. Depending on the purpose of the semiconductor device, the chip functional elements may comprise computational or signal processing circuitry. Transceiver 206 is coupled to high pass filter 204 and chip functional elements 208.

Similarly, IC 210 comprises low pass filter 212, high pass filter 214, transceiver 216, and chip functional elements 218, all of which are coupled and operate in a manner similar to the respective components of IC 200.

IC 200 transmits multiple bit data to IC 210 through power supply line $V_{CC}$ as follows. Chip functional elements 208 sends parallel bit data to transceiver 206, which serializes the multiple bit data into a serial data stream. Transceiver 206 outputs the serial data stream at a very fast rate, e.g., 7 GHz. The serial data stream is sent through high pass filter 204 as high frequency components to power supply line $V_{CC}$.

IC 210 receives the serial data stream as a high frequency component of power supply line $V_{CC}$. High pass filter 214 extracts high frequency components of power supply line $V_{CC}$ and transmits the high frequency components as the serial data stream to transceiver 216. Transceiver 216 receives the serial data stream and deserializes the serial data stream back into the transmitted parallel bit data. In this manner, a multiple bit signal is transmitted through power supply line $V_{CC}$.

The power supply reference potential is a low frequency component of power supply line $V_{CC}$. Accordingly, low pass filter 202 and low pass filter 212 extract the low frequency component to provide a steady power supply voltage to the components of IC 200 and IC 210, respectively.

Figure 3A:
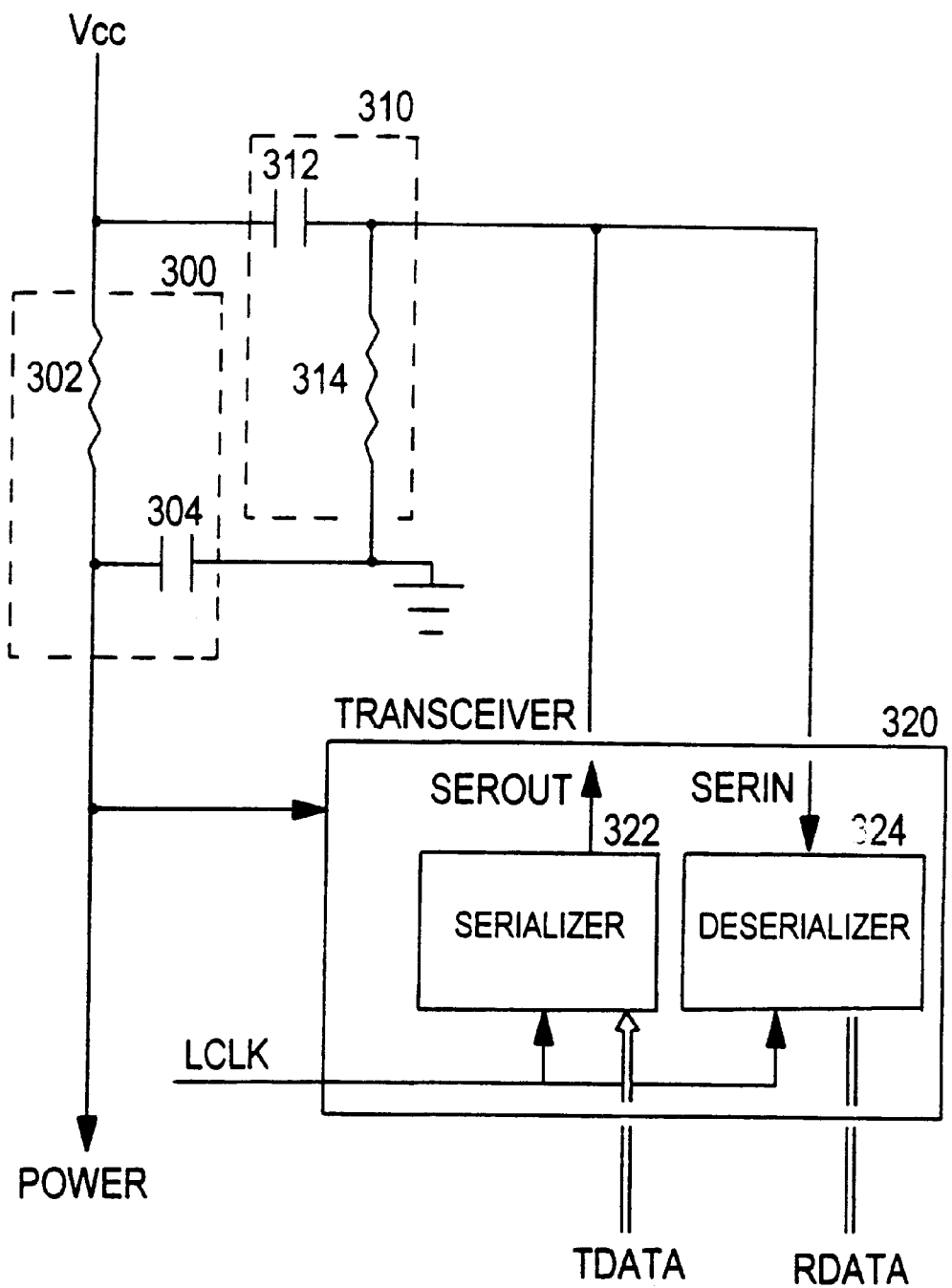
FIGS. 3(a), 3(b), and 3(c) are block diagrams showing a transceiver, serializer, and deserializer circuits, respectively, implemented according to an embodiment of the present invention.

According to one embodiment, high pass filter 214 and low pass filter 202 are implemented as standard, analog, first-order RC filters. Referring to FIG. 3(a), low pass filter 300 comprises resistor 302 and capacitor 304 coupled in series in that order from power line $V_{CC}$ to ground. The output of low pass filter 300 is tapped from the node coupling resistor 302 and capacitor 304. High pass filter 310 comprises capacitor 312 and resistor 314 coupled in series in that order from power supply line $V_{CC}$ to ground. The output of high pass filter 310 is tapped from the node coupling capacitor 312 and resistor 314.

The resistive and capacitive elements of low pass filter 300 and high pass filter 310 are implemented by well known techniques in the art of metal-oxide-semiconductor technology. Since the power supply line signal comprises only a DC steady state component and a very high frequency component, up to 7 GHz, the bandwidths of low pass filter 300 and high pass filter 310 can be very large without adversely affecting their performance. Consequently, there is much flexibility in choosing resistive and capacitive values for the filters depending on manufacturing constraints.

In this manner, only two pins, one for power, $V_{CC}$, and one for ground, are needed for both signalling and supplying power and ground potentials to the chip, instead of the twelve pins required by a conventional semiconductor device of the given example. Therefore, there is a substantial reduction in the required number of pins of a semiconductor device.

SERIALIZATION WITH ADJUSTABLE DELAY ELEMENTS

According to one embodiment of the invention, the circuitry for transceivers 206 and 216 is depicted as transceiver 300 in FIG. 3(a). Transceiver 300 comprises serializer 302 and deserializer 304, both of which receive local clock signal LCLK. Serializer 302 further receives parallel transmit data TDATA and outputs serial data output SEROUT. Deserializer 304 further receives serial data input SERIN and outputs parallel receive data RDATA.

Figure 3B:
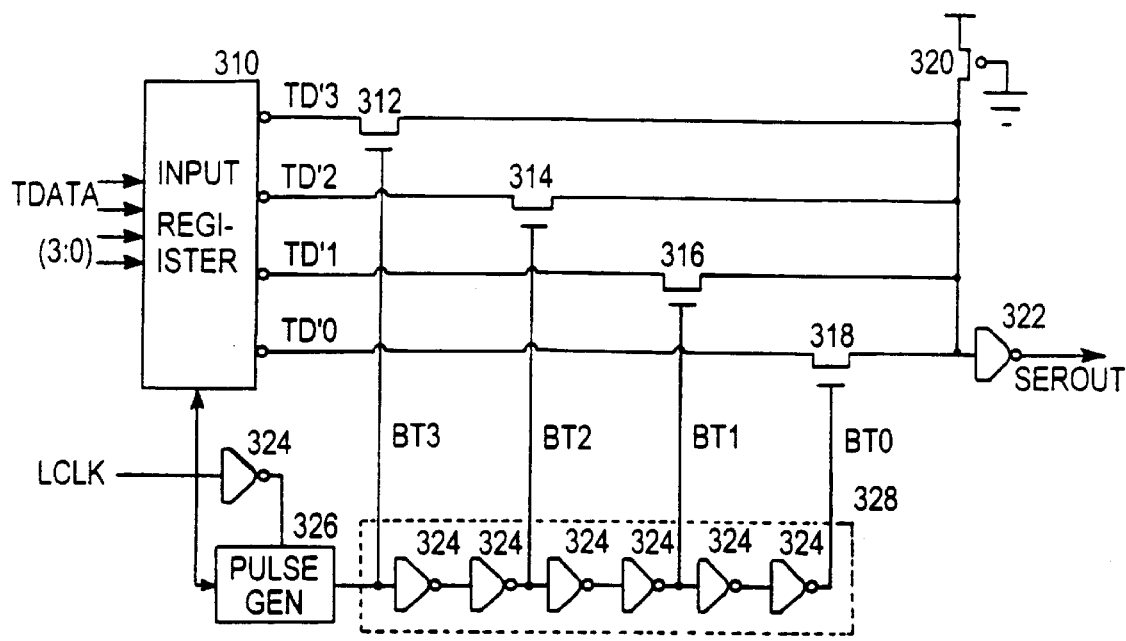

The implementation of the serialization function of transceiver 300 is shown in FIG. 3(b). The serialization function comprises input register 310 which is configured to latch parallel data bits TDATA(3:0) on receipt of local clock signal LCLK. Input register 310 provides a plurality of outputs, each of which is coupled to an input terminal of a respective switch 312–318 in a gating network comprising a plurality of MOS switches. The output terminals of the plurality of switches 312-318 are connected to a common node. Also coupled to the common node is pull-up load device 320 and output inverter 322.

The serialization function further comprises pulse generator 326 which receives local clock signal LCLK and the output of adjustable delay element 324, which also receives local clock signal LCLK. The output of pulse generator 326 is coupled to delay line 328, which comprises a plurality of adjustable delay elements 324 coupled in series. Delay line 328 has a plurality of taps BT3–BT0 at the beginning, end, and between every other adjustable delay element. Each tap, BT3–BT0, is coupled to the control terminal of a separate switch, 312–318.

Upon receiving local clock signal LCLK, input register 310 latches TDATA and outputs complemented parallel data at pins TD'3, TD'2, TD'1, and TD'0. In the embodiment shown in FIG. 3(b), input register 310 receives four parallel bits of data at a time. However, other embodiments of the invention may process a different number of parallel bits with input register 310. The exact number of bits processed by a serializer will vary from implementation to implementation.

Local clock signal LCLK is applied to adjustable delay element 324 and pulse generator 326. Pulse generator 326 outputs pulses for every clock period and of a width determined by the delay value of adjustable delay element 324. The delay value of delay element 324 is calibrated to be one-half the bit period for the serializer.

The bit period of the serializer is no longer than the period of local clock signal LCLK divided by the number of parallel bits received by input register 310. In the embodiment shown in FIG. 3(b), input register 310 receives four bits of data; thus, the bit period is no more than one quarter of the period of local clock signal LCLK.

Adjustable delay elements 324 are preferably inverters with a controllable propagation delay. In a preferred embodiment, each delay element comprises a plurality of parallel-connected inverters, each having a P-channel transistor and an N-channel transistor of a predetermined size. The propagation delay is controlled by sending a digital select control signal (not shown) that selectively enables or disables one or more of the parallel-connected inverters. In this manner, the input threshold voltage and the driving of power of the composite inverter are adjusted, resulting in a delay element with a controllable propagation delay. The implementation and operation of adjustable delay elements 324 are further described in U.S. Pat. No. 5,220,216 issued to Woo on Jun. 15, 1993, incorporated herein by reference, and U.S. Pat. No. 5,227,679 issued to Woo on Jul. 13, 1993, incorporated herein by reference.

The pulse generated by pulse generator 326 travels through delay line 328 comprising a plurality of adjustable delay elements 324, each of which is calibrated to have a delay value of no more than one-half of the bit period. There are two delay elements 324 in the delay line for every parallel bit handled by the serializer beyond the first bit. If 4-bit parallel data are input, then there must be six delay elements 324. BT0 to BT3 are taps from the delay line, providing delayed signals separated in time by the bit period.

When the pulse of BT3 arrives, switch 312 of the gating network turns on for the pulse width, or one-half the bit period. If TDATA(3) is a logical 1, then TD'3 is complemented value of logical 0. When switch 312 turns on, TD'3 is transmitted to inverter 322 and subsequently driven to line SEROUT. Likewise, the pulse travels through the delay line, switches 314, 316, and 318 of the gating network are successively turned on, transmitting TD'2, TD'1, and TD'0, respectively, sending each bit of the parallel bit data in serial. When none of switches 312 to 318 are turned on, load element 320 pulls the input to inverter 322 high, resulting in a low output voltage.

The transmission rate of serializer 322 is high-speed. For example, if adjustable delay elements 324 are calibrated to have a consistent delay of 70 ps, the transmission rate of serializer 322 is 140 ps per bit or about 7 GHz.

DESERIALIZATION WITH ADJUSTABLE DELAY ELEMENTS

In the same embodiment of the invention, transceiver 300 comprise deserialization circuitry as shown in FIG. 3(b). The SERIN line is connected to delay line 330 comprising adjustable delay elements 332 connected in series. Adjustable delay elements 332 are implemented similarly to adjustable delay elements 324 and are similarly calibrated to be one-half the bit period for the transceiver.

Delay line 330 is tapped after every other adjustable delay element 332 and coupled to inputs RD0 to RD3 of output register 334. Output register 334 also has a clock input fed by local clock signal LCLK. When local clock signal LCLK goes high, the data on inputs RD0 to RD3 are latch and output as RDATA(3:0).

Figure 3C:
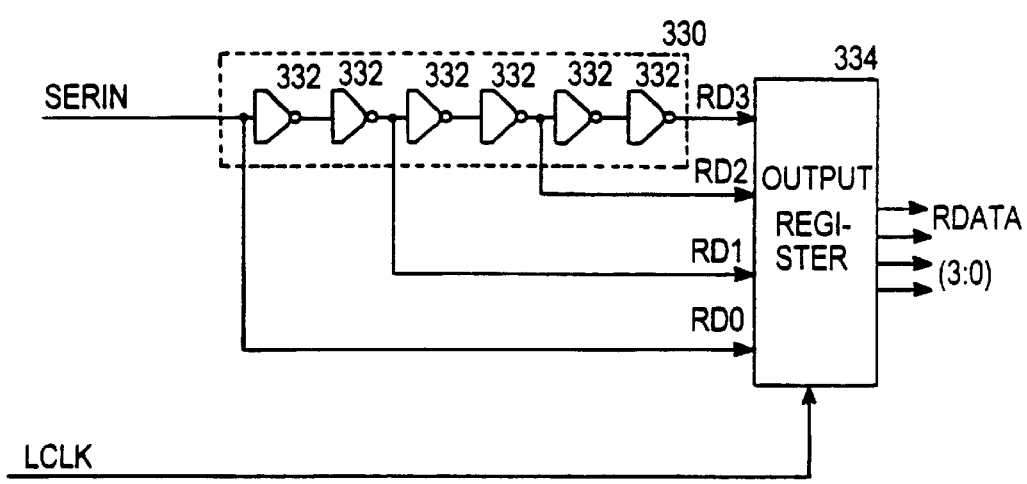

The serialization circuitry of FIG. 3(b) for serializer 302 produces a serial data stream of bits spaced by the bit period. The deserialization circuitry of FIG. 3(c) for deserializer 304 taps a serial data stream for bits spaced by the bit period. Accordingly, the deserializer 304 is able to reconstitute the multiple-bit data serialized by the serializer 302.

PHASE-INDEPENDENT TRANSCEIVER

Figure 4A:
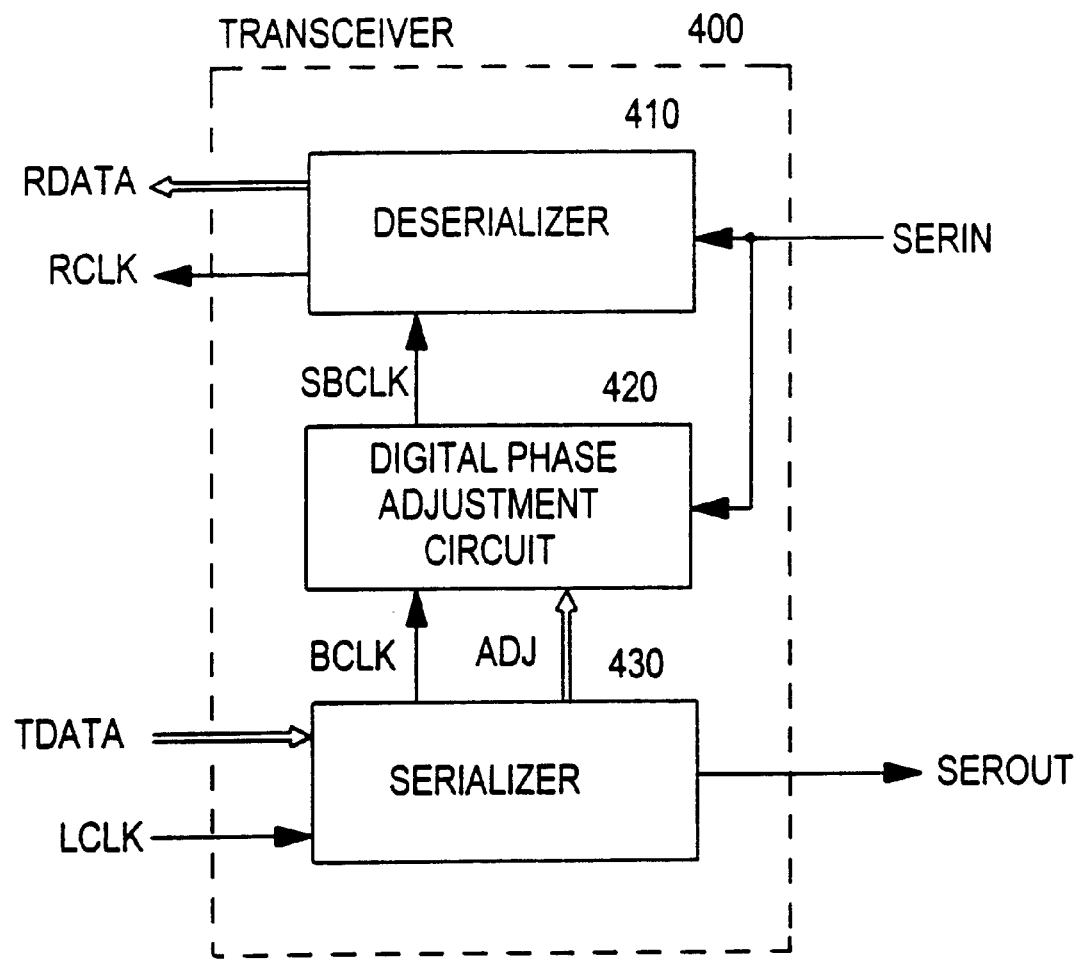
FIG. 4(a) is a block diagram showing a high-speed, all-digital transceiver implemented in accord with another embodiment of the present invention.

Deserialization 304 is sensitive to the phase of the serial data stream on line SERIN. If the serial data stream is out-of-phase with respect to local clock signal LCLK, then it is possible that bit data of the serial data stream would be latched incorrectly. For example, if the serial data stream is out-of-phase by a bit period, then bit TDATA(0) would be incorrectly received as RDATA(1), TDATA(1) as RDATA (2), and so forth. Accordingly, one embodiment of the invention provides a high-speed, phase-independent transceiver, shown as transceiver 400 in FIG. 4(a) and described in U.S. Pat. No. 5,400,370 issued to Guo on Mar. 21, 1995, incorporated herein by reference.

Transceiver 400 is all-digital, in that it does not implement large, lumped, analog components, such as capacitors, for data storage, timing or other functions, and hence readily implemented upon a large scale integrated circuit. The transceiver 400 has three major components, deserializer 410, digital phase adjustment circuit 420, and serializer 430. Serializer 430, described in U.S. Pat. No. 5,349,612, issued to Guo et al. on Sep. 20, 1994, incorporated herein by reference, receives parallel data package TDATA, in N-bit nybbles clocked by local clock LCLK. The operation of serializer 430 in serializing an N-bit nybble TDATA is described with reference to the timing diagram in FIG. 4(b).

For each cycle of local clock LCLK, serializer 430 generates N cycles of bit clock BCLK, the first bit clock cycle being aligned with an edge of local clock LCLK. The period of bit clock BCLK is at most the period of local clock LCLK divided by N, but the bit clock period does not have to be an integral fraction of the local clock period. The cycles of bit clock BCLK are produced by a cascade of adjustable, digital delay elements, which are preferably calibrated by an on-chip digital servo subcomponent of serializer 430, described in U.S. Pat. No. 5,457,719, issued to Guo et al. on Oct. 10, 1995. The result of the calibration circuit is sent as signal ADJ from serializer 430 to also calibrate the adjustable, digital delay elements of digital phase adjustment circuit 420.

Figure 4B:
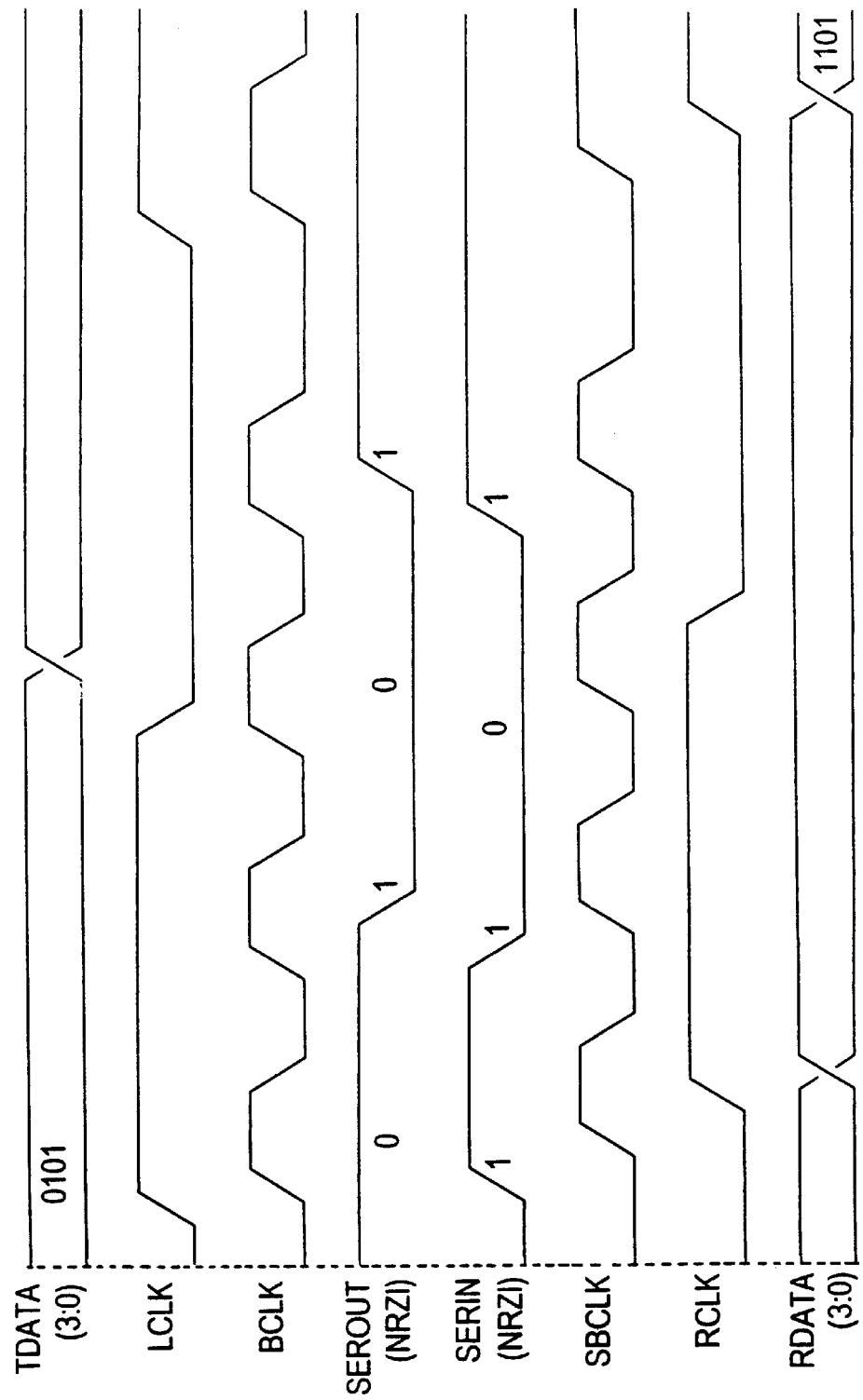
FIG. 4(b) is a timing diagram of the signals of the high speed, all-digital transceiver of FIG. 4(b).

Given parallel data nybble TDATA and generated bit clock BCLK, serializer 430 encodes nybble TDATA into a bit stream SEROUT, which may be an ECL signal for high-speed transmission. One encoding, as shown in FIG. 4(b) is NRZI (Non-Return to Zero, Invert on one), where a transition signifies a one and a lack of a transition signifies a zero. Other encodings such as NRZ or Manchester may be used as well in other embodiments of the invention.

When transceiver 400 receives an incoming serial data stream SERIN, the clock signal for incoming serial data stream SERIN is generally out of phase with respect to bit clock BCLK. Therefore, digital phase adjustment circuit 420 shifts the phase of the bit clock BCLK to create shifted bit clock SBCLK, having a timing edge aligned with the center of the data eye of the incoming serial data stream SERIN. Deserializer 410 takes shifted bit clock SBCLK and decodes incoming serial data stream SERIN, into received data nybble RDATA. Deserializer 410 is described in more detail in U.S. Pat. No. 5,367,542, issued to Guo on Nov. 22, 1994, incorporated herein by reference.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An integrated circuit comprising:
   a power supply pin for coupling to a power supply line;
   a first filter coupled to said power supply pin and configured for removing high-frequency components from said power supply line to power a functional element;
   a second filter coupled to said power supply pin and configured for extracting a high-frequency signal from said power supply line; and
   a transceiver coupled to said second filter and said functional element and configured for deserializing said high-frequency signal into a first plurality of bits, outputting said plurality of bits to said functional element, serializing a second plurality of bits into a serial data stream, and outputting said serial data stream to said power supply line pin through said second filter.

2. The integrated circuit of claim 1, wherein said transceiver includes:
   a serializer coupled to said second filter and said functional element and configured for serializing said second plurality of bits into said serial data stream and outputting said serial data stream to said power supply line through said second filter; and
   a deserializer coupled to said second filter and said functional element and configured for deserializing said high-frequency signal into said first plurality of bits and outputting said plurality of bits to said functional element.

3. The integrated circuit of claim 2, wherein said serializer includes:

a first plural stage register for latching a multibit word to be serialized, each register stage having an output;

a gating network, said gating network including a plurality of switches, each said switch including an input, output, and control terminal, the output terminal of all the said switches coupled to a node and the input terminal of each said switch connected to a different one of said register stage outputs;

a digitally regulated time delay circuit, comprising a plurality of adjustable delay elements connected in series from their inputs to their outputs; and each control terminal of said gating network switches being connected to a different said input or output of one of said adjustable delay elements.

4. The integrated circuit of claim 3, wherein serializer further includes:

a pull up circuit, coupled to said node; and an output driver circuit, coupled to said node.

5. The integrated circuit of claim 2, wherein said deserializer includes:

a digitally regulated time delay circuit, comprising a plurality of adjustable delay elements connected in series from their inputs to their outputs; and a plural stage register for latching a deserialized multibit word, each said register stage having an input, wherein each input of said plural stage register being coupled to a different said input or output of one of said adjustable delay elements.

6. The integrated circuit of claim 2, wherein said transceiver further includes a digital phase adjustment circuit coupled to said serializer and said deserializer.

7. The integrated circuit of claim 1, wherein said first filter comprises a low pass filter.

8. The integrated circuit of claim 1, wherein said second filter comprises a high pass filter.

9. A network of a plurality of semiconductor devices, comprising a power supply line, wherein each semiconductor device comprises:

a power supply pin for coupling to said power supply line;

a first filter coupled to said power supply and configured for removing high-frequency components from said power supply line to power a functional element;

a second filter coupled to said power supply pin and configured for extracting a high-frequency signal from said power supply line; and a transceiver coupled to said second filter and said functional element and configured for deserializing said high-frequency signal into a first plurality of bits, outputting said plurality of bits to said functional element, serializing a second plurality of bits into a serial data stream, and outputting said serial data stream to said power supply line pin through said second filter.

10. The network of claim 9, wherein each said transceiver includes:

a serializer coupled to said second filter and said functional element and configured for serializing said second plurality of bits into said serial data stream and outputting said serial data stream to said power supply line through said second filter; and a deserializer coupled to said second filter and said functional element and configured for deserializing said high-frequency signal into said first plurality of bits and outputting said plurality of bits to said functional element.

11. The network of claim 10, wherein each said serializer includes:

a first plural stage register for latching a multibit word to be serialized, each register stage having an output;

a gating network, said gating network including a plurality of switches, each said switch including an input, output, and control terminal, the output terminal of all the said switches coupled to a node and the input terminal of each said switch connected to a different one of said register stage outputs;

a digitally regulated time delay circuit, comprising a plurality of adjustable delay elements connected in series from their inputs to their outputs; and each control terminal of said gating network switches being connected to a different said input or output of one of said adjustable delay elements.

12. The network of claim 11, wherein each said serializer further includes:

a pull up circuit, coupled to said node; and an output driver circuit, coupled to said node.

13. The network of claim 11, wherein each said deserializer includes:

a digitally regulated time delay circuit, comprising a plurality of adjustable delay elements connected in series from their inputs to their outputs; and a second plural state register for latching a deserialized multibit word, each said register stage having an input, wherein each input of said second plural stage register being coupled to a different said input or output of one of said adjustable delay elements.

14. The network of claim 11, wherein each said transceiver further includes a digital phase adjustment circuit coupled to said serializer and said deserializer.

15. An integrated circuit comprising:

a power supply pin for coupling to a power supply line;

a first filter coupled to said power supply pin and configured for removing highfrequency components from said power supply line to power a functional element;

a second filter coupled to said power supply pin and configured for extracting a highfrequency signal from said power supply line; and a transceiver coupled to said second filter and said functional element and configured for deserializing said high-frequency signal extract from said second filter into a plurality of bits and outputting said plurality of bits to said functional element.

16. An integrated circuit comprising:

a power supply pin for coupling to a power supply line;

a first filter coupled to said power supply pin and configured for removing high-frequency components from said power supply line to power a functional element;

a second filter coupled to said power supply pin; and a transceiver coupled to said second filter and said functional element and configured for serializing a plurality of bits into a serial data stream, and outputting said serial data stream to said power supply line pin through said second filter.

* * * * *